July 17, 1923.
K. GAMMEL
COOKING UTENSIL
Filed May 21, 1921
1,462,275
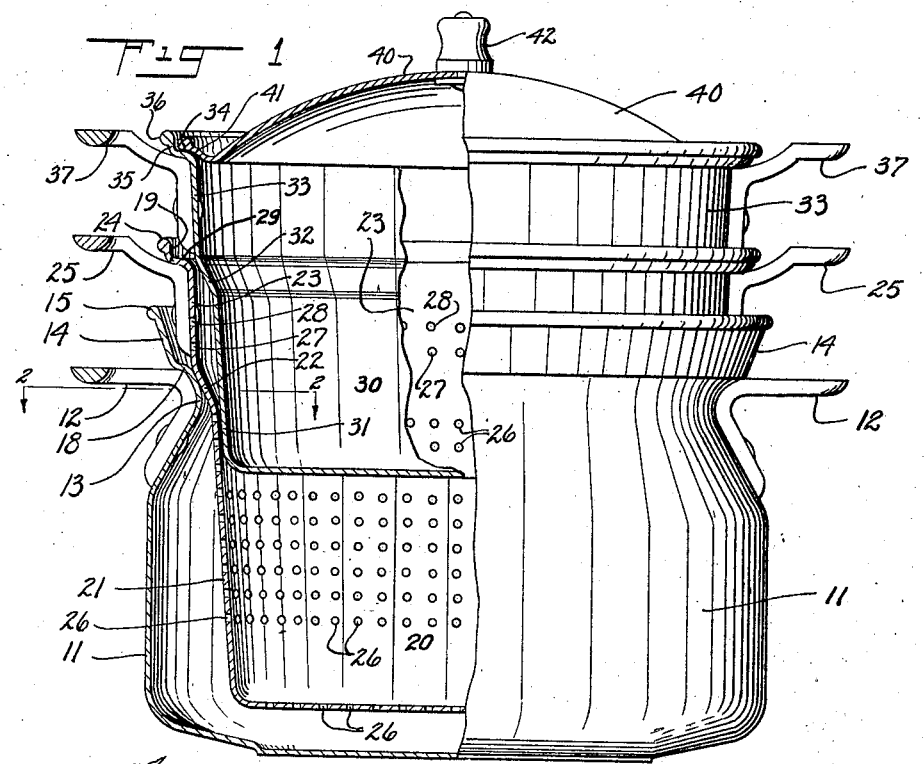
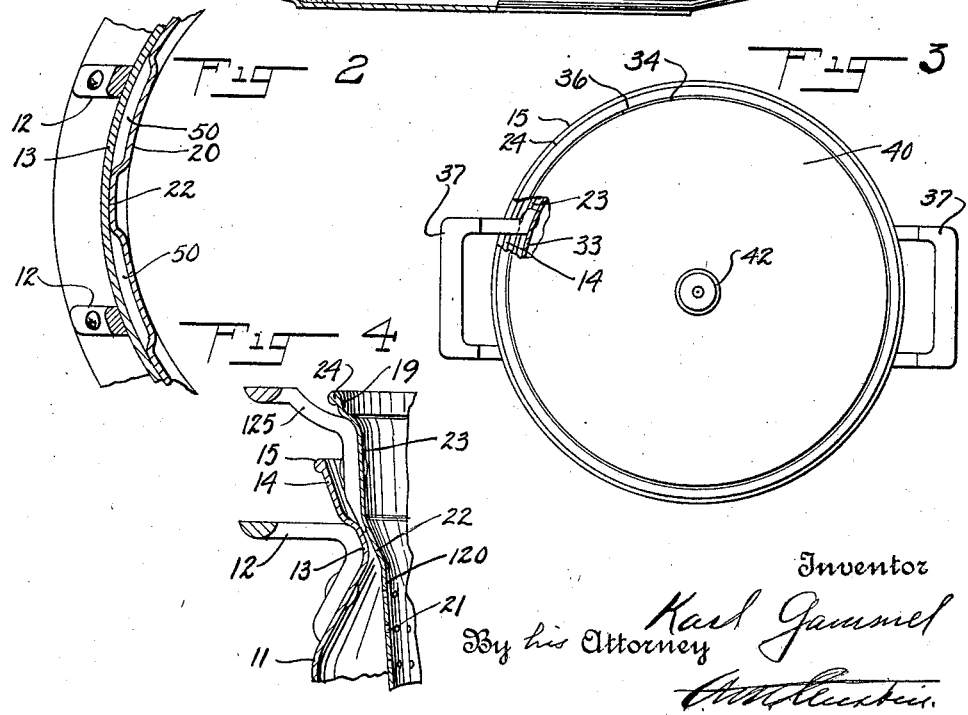
Inventor
Karl Gammel
By his Attorney Patented July 17, 1923.

1,462,275

UNITED STATES PATENT OFFICE.

KARL GAMMEL, OF CLEVELAND, OHIO.

COOKING UTENSIL.

Application filed May 21, 1921. Serial No. 471,427.

*To all whom it may concern:*

Be it known that I, KARL GAMMEL, a citizen of the United States, and resident of Cleveland, in the county of Cuyahoga and State of Ohio, have invented certain new and useful Improvements in Cooking Utensils, of which the following is a specification.

This invention relates to improvements in cooking utensils and more particularly to cooking utensils of the type known as double boilers, in which a plurality of differently characterized utensils may be used singly or in combination.

Broadly stated, it is the object of the present invention to provide improved forms of nested cooking utensils, of simple and rugged construction.

More particularly, it is an object of the invention to provide an efficient double boiler adapted for use in usual cooking operations and especially for cooking foods difficult to prepare properly, such as macaroni, spaghetti and the like.

Another object relates to means for economizing in the use of water or other cooking medium, whereby such of the medium as escapes due to violent boiling is automatically returned to the boiling kettle.

In accordance with these objects, I provide a plurality of nested members comprising an outer receptacle, a sieve therein, a boiler and a cover. In utensils of the prior art, it has been found that even a very tight seat between any two of the various members does not prevent the boiling medium from escaping through the seat, due to the extreme violence of the boiling when a hot fire, such as a gas stove, is used, but does interfere with the return, so that the medium overflows and is lost. In the present improvements the liquid may readily flow back into the boiling pot, and an economy in boiling medium thus results. Furthermore, strains due to confinement of the boiling liquid are eliminated, thus increasing the life of the utensils.

In accordance with another feature, I provide improved forms of handles, used for the three-fold purpose of serving as handles, as spacers to insure a spaced relation of parts during boiling, and as reinforcements to strengthen the assembled utensils, rendering the same capable of withstanding violent agitation due to boiling with a minimum of material.

Referring to the drawings,

Figure 1 is a side view of one form of the cooking utensil of my invention with parts broken away;

Figure 2 is a horizontal section taken on line 2—2 of Figure 1;

Figure 3 is a plan view;

Figure 4 shows a modified form of the structure shown in Figure 1.

Referring to Figure 1, 11 designates a usual pot or kettle made of a suitable material, such as aluminum or the like. Suitable means may be provided for manipulating the pot 11, that shown consisting of a pair of diametrically positioned handles 12 secured to the upper portion of the kettle 11, in any desired manner, such as by riveting. The kettle 11 has a restricted portion 13, and an upwardly extending flange 14 terminating in a beaded rim 15.

The sieve 20, of a suitable material such as aluminum, is formed with a body portion 21, shoulders 22, 29, intermediate portion 23, upper portion 19, and has a similar beaded edge 24. The handles 25 are attached to the intermediate portion 23 in any suitable manner, as for example, by riveting. In the structure shown in Figure 1, the sieve 20 is fluted at the shoulder portion 22 to form a plurality of vertical channels 50 interconnecting the space between the flange 14 and portion 23. The sieve 20 is perforated by a plurality of apertures such as 26, 26 in a well known manner. It may also be provided with two rows of annularly arranged apertures 27, 28 in the upper portion 23 above the shoulder 22. In practice it is preferable to omit said apertures in the vicinity of the handles 25, so that the hands may be protected from escaping steam. Steam escaping through the row of apertures 28 may condense on the flange 14, and the condensation is automatically returned to the kettle 11, by force of gravity.

The boiler 30, made of a suitable material such as aluminum, is formed with a body portion 31, the annular shoulders 32, 34, the intermediate portion 33 and the upper portion 35, terminating in the beaded edge 36. Handles 37 are provided as described for sieve 20.

The cover 40 is provided with a usual seating flange 41 and knob 42, said knob being preferably of a material that is a poor conductor of heat, such as wood.

Referring now to Figure 4, which may be substituted for a corresponding portion of Figure 1, the shoulder 22 of the sieve 20 is made plain, and is constructed to be positioned in uniform spaced relationship with the inner surface of restricted portion 13 of the pot 11, being supported upon downwardly extending portions of the handles 125, said extensions being preferably wedge-shaped as shown. It will be seen that the sieve 120 of Figure 4 presents no irregular surfaces, and thus may be made of material substantially thinner than required for the sieve 20 of Figure 2 to withstand the unavoidable knocking and abuse received in the usual kitchen operations such as dishwashing. Thus a considerable saving in material is effected.

The inner diameters of portions 19 and 35 are substantially equal and also correspond to that of a part of the restricted portion 13, so that the cover 40 may cooperate with any of the members 11, 20 and 30. It is obvious that any of these members may be used separately and that a plurality of covers 40 may be provided, and also that any desired pair of said members may be used in a cooking operation.

Similarly the outer diameters of shoulders 22, 32 correspond to that of the inner surface of portion 13, so that either may cooperate therewith. It will be seen that the raised portions 22 of the corrugations of sieve 20 of Figure 2, and the handles 125 of Figure 4 act as wedges to render the assembled structure rigid and capable of resisting even violent agitation of the boiling water.

By means of the construction of the structure of Figure 4 the handles 125 are held rigid and these handles are therefore less easily shaken loose from their fastenings.

The present disclosure shows preferred embodiments of my invention, but it is understood that the scope of my invention is not to be determined thereby, reference being had to the appended claims for that purpose.

Having thus described my invention, I claim:

1. In a cooking utensil, a plurality of nested members adapted for use in varying combinations, positive means for maintaining the members in spaced relation, an inner one of said members having a portion above the level of the positive means, and means for draining escaped boiling medium to a predetermined one of said members.

2. In a cooking utensil, an outer receptacle comprising a body portion, a restricted intermediate portion, and an upper portion, and a sieve comprising a body portion removably positioned in the body portion of said outer receptacle, an annular shoulder adapted to engage the restricted portion of said receptacle, said shoulder having a plurality of perpendicular channels forming drains for the upper portion of said receptacle, and comprising also a portion above the shoulder, said portion having perforations therethrough for conducting steam.

3. In a cooking utensil, an outer receptacle comprising a body portion, a restricted intermediate portion, and an upper portion, a sieve comprising a body portion removably positioned in the body portion of said outer receptacle, a fluted annular shoulder, and an inner receptacle supported upon said fluted shoulder, and comprising also a portion above the shoulder, said portion having perforations therethrough for conducting steam.

4. In a cooking utensil, a plurality of nested members adapted for use in varying combinations, and a handle secured to an intermediate one of said members constructed to form a separating wedge for maintaining said intermediate member in spaced relation with the member outwardly adjacent thereto.

5. In a cooking utensil, a plurality of nested members adapted for use in combinations, and a handle secured to an intermediate one of said members constructed to rigidly support said intermediate member upon the member outwardly adjacent thereto, and to furnish support to the member inwardly adjacent thereto.

6. In a cooking utensil, an outer receptacle comprising a body portion, an upper portion and a restricted intermediate portion, a sieve comprising a body portion, an upper enlarged portion and an intermediate shoulder, said sieve components being relatively less in diameter than removably positioned in the respective portions of said outer receptacle, and a handle for said sieve terminating in a separating wedge positioned between the intermediate portion of said receptacle and said shoulder and constructed to reenforce the utensil when assembled, and to clamp said handle to the sieve.

7. In a cooking utensil, an outer receptacle comprising a body portion and restricted intermediate portion and an upwardly extending portion, and a sieve corresponding therewith comprising a body portion removably positioned in a body portion of the outer receptacle and having an angular shoulder attached to engage the restricted portion of the outer receptacle and having an upwardly extending portion for perforations through which steam may escape into the space within the upper portion of the outer receptacle.

Signed at Cleveland in the county of Cuyahoga and State of Ohio this 19th day of May A. D. 1921.

KARL GAMMEL.